United States Patent
Park et al.

(10) Patent No.: US 12,266,777 B2
(45) Date of Patent: Apr. 1, 2025

(54) BATTERY MODULE INCLUDING INTERNAL PLATE

(71) Applicant: LG CHEM, LTD., Seoul (KR)

(72) Inventors: Ji-Soo Park, Daejeon (KR); Choon-Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 76 days.

(21) Appl. No.: 16/982,989

(22) PCT Filed: Dec. 12, 2019

(86) PCT No.: PCT/KR2019/017600
§ 371 (c)(1),
(2) Date: Sep. 21, 2020

(87) PCT Pub. No.: WO2020/145530
PCT Pub. Date: Jul. 16, 2020

(65) Prior Publication Data
US 2021/0021007 A1    Jan. 21, 2021

(30) Foreign Application Priority Data
Jan. 10, 2019    (KR) .................. 10-2019-0003389

(51) Int. Cl.
*H01M 10/6555*    (2014.01)
*H01M 10/613*    (2014.01)
(Continued)

(52) U.S. Cl.
CPC ..... *H01M 10/6555* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 9,173,307 B2    10/2015    Lee et al.
9,461,344 B2    10/2016    Lee et al.
(Continued)

FOREIGN PATENT DOCUMENTS

CN    1592977 A    3/2005
CN    102013461 A    4/2011
(Continued)

OTHER PUBLICATIONS

International Search Report issued in corresponding International Patent Application No. PCT/KR2019/017600, dated Mar. 20, 2020.
(Continued)

*Primary Examiner* — Amanda J Barrow
(74) *Attorney, Agent, or Firm* — Morgan, Lewis & Bockius LLP

(57) ABSTRACT

A battery module protects an internal configuration from external impact and effectively prevents internal short circuiting. The battery module includes a plurality of can type secondary batteries arranged to be disposed in a horizontal direction; a bus bar at least partially formed of an electrically conductive material to be electrically connected with the plurality of can type secondary batteries; at least two or more module cases with an empty space defined therein to accommodate the plurality of can type secondary batteries therein, the two or more module cases including an outer wall surrounding the empty space inside and at least two or more ribs protruding from the outer wall in an outward direction, and configured to be stacked in a direction in which the can type secondary batteries are disposed; and an internal plate interposed between the two or more module cases and configured to be erected in a direction perpendicular to the horizontal direction in which the module cases are stacked.

13 Claims, 10 Drawing Sheets

(51) Int. Cl.
    *H01M 10/625*     (2014.01)
    *H01M 10/643*     (2014.01)
    *H01M 50/213*     (2021.01)
    *H01M 50/24*     (2021.01)
    *H01M 50/242*     (2021.01)
    *H01M 50/262*     (2021.01)
    *H01M 50/289*     (2021.01)
    *H01M 50/50*     (2021.01)
    *H01M 50/502*     (2021.01)
    *H01M 50/574*     (2021.01)

(52) U.S. Cl.
    CPC ....... *H01M 10/643* (2015.04); *H01M 50/213* (2021.01); *H01M 50/24* (2021.01); *H01M 50/242* (2021.01); *H01M 50/262* (2021.01); *H01M 50/289* (2021.01); *H01M 50/50* (2021.01); *H01M 50/502* (2021.01); *H01M 50/574* (2021.01); *H01M 2200/00* (2013.01); *H01M 2220/20* (2013.01)

(56) References Cited

U.S. PATENT DOCUMENTS

| | | | |
|---|---|---|---|
| 9,564,663 | B2 | 2/2017 | Kim et al. |
| 10,700,394 | B2 | 6/2020 | Murata et al. |
| 2005/0079408 | A1 | 4/2005 | Hirano |
| 2009/0297892 | A1 | 12/2009 | Ijaz et al. |
| 2010/0151309 | A1* | 6/2010 | Marukawa .......... H01M 10/613 429/120 |
| 2011/0076521 | A1 | 3/2011 | Shimizu et al. |
| 2011/0189525 | A1* | 8/2011 | Palanchon ........ H01M 10/6551 165/81 |
| 2011/0293973 | A1* | 12/2011 | Kim .................... H01M 50/271 429/163 |
| 2013/0082659 | A1* | 4/2013 | Kano .................. H01M 50/213 307/66 |
| 2013/0313953 | A1* | 11/2013 | Lee ...................... H05K 5/0213 312/236 |
| 2013/0323551 | A1* | 12/2013 | Lee .................. H01M 10/6556 429/83 |
| 2015/0079449 | A1 | 3/2015 | Kim et al. |
| 2015/0147622 | A1* | 5/2015 | Hwang ................. H01M 50/20 429/120 |
| 2015/0214518 | A1* | 7/2015 | Kano .................. H01M 50/222 429/99 |
| 2015/0214524 | A1 | 7/2015 | Takasaki et al. |
| 2015/0222131 | A1 | 8/2015 | Kano |
| 2016/0006006 | A1* | 1/2016 | Motokawa .......... H01M 50/308 429/54 |
| 2017/0005376 | A1 | 1/2017 | Harris et al. |
| 2017/0125755 | A1 | 5/2017 | Kim et al. |
| 2017/0133642 | A1* | 5/2017 | Lee ..................... H01M 50/291 |
| 2017/0305250 | A1* | 10/2017 | Hara ..................... H01M 50/20 |
| 2017/0324128 | A1 | 11/2017 | Milton et al. |
| 2017/0373287 | A1 | 12/2017 | Yamashita et al. |
| 2018/0175466 | A1* | 6/2018 | Seo ........................ H01M 50/20 |
| 2018/0183119 | A1 | 6/2018 | Ju et al. |
| 2019/0115570 | A1* | 4/2019 | McCollum ............ H01M 50/20 |
| 2019/0296293 | A1 | 9/2019 | Scharner |
| 2019/0326569 | A1* | 10/2019 | Chi ....................... H01M 50/10 |
| 2020/0014006 | A1* | 1/2020 | Oliveira .............. H01M 50/222 |
| 2020/0185672 | A1* | 6/2020 | Seo ................... H01M 10/6557 |
| 2020/0203788 | A1* | 6/2020 | Kang .................... H01M 50/30 |
| 2020/0411814 | A1* | 12/2020 | Ju ........................ H01M 50/236 |
| 2021/0046621 | A1* | 2/2021 | Park ....................... B25B 23/08 |
| 2021/0050568 | A1* | 2/2021 | Yang .................. H01M 10/482 |

FOREIGN PATENT DOCUMENTS

| | | | | |
|---|---|---|---|---|
| CN | 102263212 | A1 | 11/2011 | |
| CN | 103117367 | A | 5/2013 | |
| CN | 103493243 | A | 1/2014 | |
| CN | 103503192 | A | 1/2014 | |
| CN | 103608946 | A | 2/2014 | |
| CN | 104577253 | A | 4/2015 | |
| CN | 104603976 | A | 5/2015 | |
| CN | 104934654 | A | 9/2015 | |
| CN | 105564822 | A | 5/2016 | |
| CN | 206639823 | U | 11/2017 | |
| CN | 107785634 | A | 3/2018 | |
| CN | 108232358 | A | 6/2018 | |
| CN | 108448041 | A | 8/2018 | |
| GB | 2560039 | | * 8/2018 | ............. H01M 2/10 |
| JP | 2003-162993 | A | 6/2003 | |
| JP | 2012-119138 | A | 6/2012 | |
| JP | 2012-221844 | A | 11/2012 | |
| JP | 2013-218931 | A | 10/2013 | |
| JP | 2016-27578 | A | 2/2016 | |
| JP | WO2014-038184 | A1 | 8/2016 | |
| KR | 10-2010-0134111 | A | 12/2010 | |
| KR | 10-2013-0034596 | A | 4/2013 | |
| KR | 10-2014-0008123 | A | 1/2014 | |
| KR | 10-2014-0128844 | A | 11/2014 | |
| KR | 10-2018-0009020 | A | 1/2018 | |
| KR | 10-2018-0069989 | A | 6/2018 | |
| KR | 10-2018-0074133 | A | 7/2018 | |
| KR | 10-1892116 | B1 | 8/2018 | |
| WO | 2016/204140 | A1 | 12/2016 | |
| WO | 2018/108371 | A1 | 6/2018 | |

OTHER PUBLICATIONS

Office Action issued in corresponding Chinese Patent Application No. 201980020687.6, dated May 9, 2023.

* cited by examiner

BATTERY MODULE INCLUDING INTERNAL PLATE

TECHNICAL FIELD

The present disclosure relates to a battery module including an internal plate, and more particularly, to a battery module that prevents fire or explosion between secondary batteries which are internal components and improves cooling efficiency.

The present application claims priority to Korean Patent Application No. 10-2019-0003389 filed on Jan. 10, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active material and negative electrode active materials, respectively. The lithium secondary battery includes an electrode assembly in which a positive electrode plate and a negative electrode plate coated with a positive electrode active material and a negative electrode active material respectively are arranged with a separator interposed therebetween, and a sheath material, that is, a battery pouch sheath material, that seals and accommodates the assembly together with an electrolyte solution.

Recently, secondary batteries are widely used not only in small devices such as portable electronic devices but also in medium and large devices such as vehicles and energy storage systems. When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, recently, as a need for a large-capacity structure has been increased, including utilization as an energy storage source, a demand for a battery module having a plurality of secondary batteries electrically connected in series and/or in parallel has increased. Moreover, in order to configure a high-current, high-capacity battery module in a smaller volume, there are many cases in which spaces between a plurality of secondary batteries electrically connected and expanded are densely arranged.

In particular, in such a battery module, an accident may occur in which a plurality of secondary batteries may fire or explode due to specific factors (e.g., malfunction or configuration failure), or the secondary batteries fire or explode due to external impact. Moreover, in such a battery module, since the plurality of secondary batteries are disposed to be very adjacent to each other, even when one secondary battery fires or explodes, flame or heat is easily transferred to another adjacent secondary battery, there was a problem in that a secondary explosion or fire easily occurs.

Furthermore, such a battery module having the plurality of secondary cells densely arranged in this way may easily and quickly accumulate heat inside the battery module, thereby shortening the life of the battery module. Accordingly, in the related art, it is very important to effectively discharge the internal heat of the battery module to the outside.

DISCLOSURE

Technical Problem

The present disclosure is designed to solve the problems of the related art, and therefore the present disclosure is directed to providing a battery module that prevents fire or explosion between secondary batteries that are internal components and improves cooling efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a plurality of can type secondary batteries arranged to be laid down in a horizontal direction; a bus bar at least partially formed of an electrically conductive material to electrically connect the plurality of can type secondary batteries; at least two or more module cases with an empty space formed inside to insert and accommodate the plurality of can type secondary batteries, comprising an outer wall formed to surround the empty space inside and at least two or more ribs formed to protrude from the outer wall in an outer direction, and configured to be stacked in a direction in which the can type secondary batteries are laid down; and an internal plate interposed between the two or more module cases and configured to be erected in a direction perpendicular to a direction in which the module cases are stacked.

The internal plate may be positioned to contact a protruding end portion of the rib.

A fixing groove indented in an inner direction may be formed in an outer surface of the internal plate such that the end portion of the rib is inserted and fixed.

The internal plate may have an uneven structure formed to be bent to protrude in a horizontal direction, and the uneven structure may be inserted between the two or more ribs.

The bus bar may be inserted between one rib and another adjacent rib.

A curved groove indented in an inner direction may be formed in an end portion of the rib connected to an outer wall of the module case.

A position of the bus bar may be fixed by inserting one end into a curved groove of the rib and inserting the other end into a curved groove of the other rib.

The module case may include a bumper portion formed to protrude in an outer direction from an outer surface of the outer wall to absorb an external impact applied to the battery module and having a space apart from the outer wall by a predetermined distance.

The bumper portion may include an extension part protruding and extending from the outer wall of the module case; and a plate-shaped part bent and extending from an end portion in an extension direction of the extension part in a direction corresponding to the outer wall of the module case, and having a linear rib formed thereon.

At least a part of the bus bar may be positioned between the plate-shaped part of the bumper portion and the outer wall of the module case.

In another aspect of the present disclosure, there is provided a battery pack including the at least one battery module.

In another aspect of the present disclosure, there is provided a vehicle including the at least one battery pack.

Advantageous Effects

According to an aspect of the present disclosure, when a battery module is charged and discharged, heat generated in a secondary battery may be transferred to ribs of a module case and an internal plate contacting the ribs, and may be dissipated to the outside through air contacting the internal plate. Accordingly, it is possible to improve the cooling efficiency of the battery module.

In addition, when a plurality of can type secondary batteries accommodated in two or more module cases fire or explode, the battery module may block the plurality of can type secondary batteries accommodated in different module cases so as not to be affected by flame or gas, thereby effectively improving the stability of the battery module.

Moreover, according to an aspect of another embodiment of the present disclosure, by forming a fixing groove indented in the inner direction such that the end portion of a rib is inserted and fixed to the outer surface of the internal plate, the internal plate is easily fixed between two or more module cases, thereby facilitating the manufacturing process. In addition, there is an advantage that the cooling efficiency of the battery module may be further increased by effectively increasing a contact area between the fixing groove and the rib.

In addition, according to an aspect of the present disclosure, by inserting an uneven structure formed on the internal plate between two or more ribs, the internal plate is easily fixed between two or more module cases, thereby facilitating the manufacturing process. In addition, there is an advantage that the cooling efficiency of the battery module may be further increased by effectively increasing a contact area between the uneven structure and the rib.

Furthermore, according to an aspect of the present disclosure, a bus bar is inserted between one rib and another adjacent rib, and thus a process of positioning the bus bar in a mounting portion of the module case may be facilitated. In addition, after the bus bar is inserted, in a welding process with electrode terminals of the plurality of secondary batteries, it is possible to prevent the bus bar from flowing in the front and back directions, and thus the welding process may be performed quickly and completely.

In addition, according to an aspect of the present disclosure, the module case is provided with a bumper portion configured to absorb an external impact applied to the battery module, and when the external impact occurs in the battery module, the bumper portion may absorb the impact preferentially and protect the embedded secondary battery. Accordingly, it is possible to increase the stability of the battery module.

Moreover, according to an aspect of the present disclosure, the bumper portion of the module case covers a portion of the bus bar that is easily exposed in the front and back directions, thereby preventing contact or collision with external conductive materials and maintaining electrical insulation from the outside. Accordingly, when an external impact occurs, a secondary accident due to electric leakage of the battery module may be prevented.

In addition, according to an aspect of the present disclosure, by further forming an auxiliary bumper portion in a space apart between the bumper portion and an outer wall of the module case, the bumper portion and the auxiliary bumper portion may more effectively absorb the external impact applied to the battery module. Accordingly, the secondary battery embedded in the battery module may be protected from external impacts, thereby effectively preventing fire or explosion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
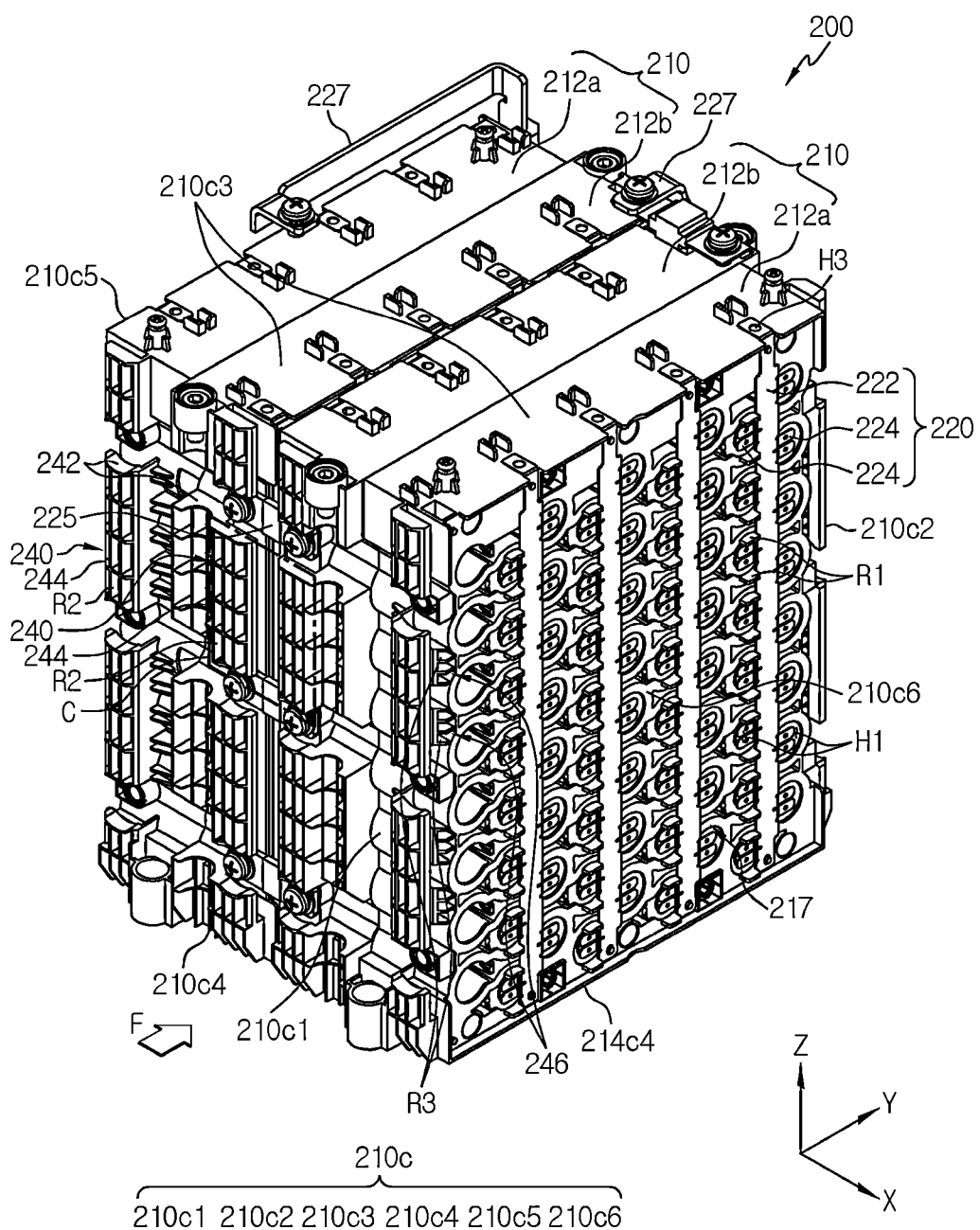
FIG. 1 is a perspective view schematically showing a battery module according to an embodiment of the present disclosure.
Figure 2:
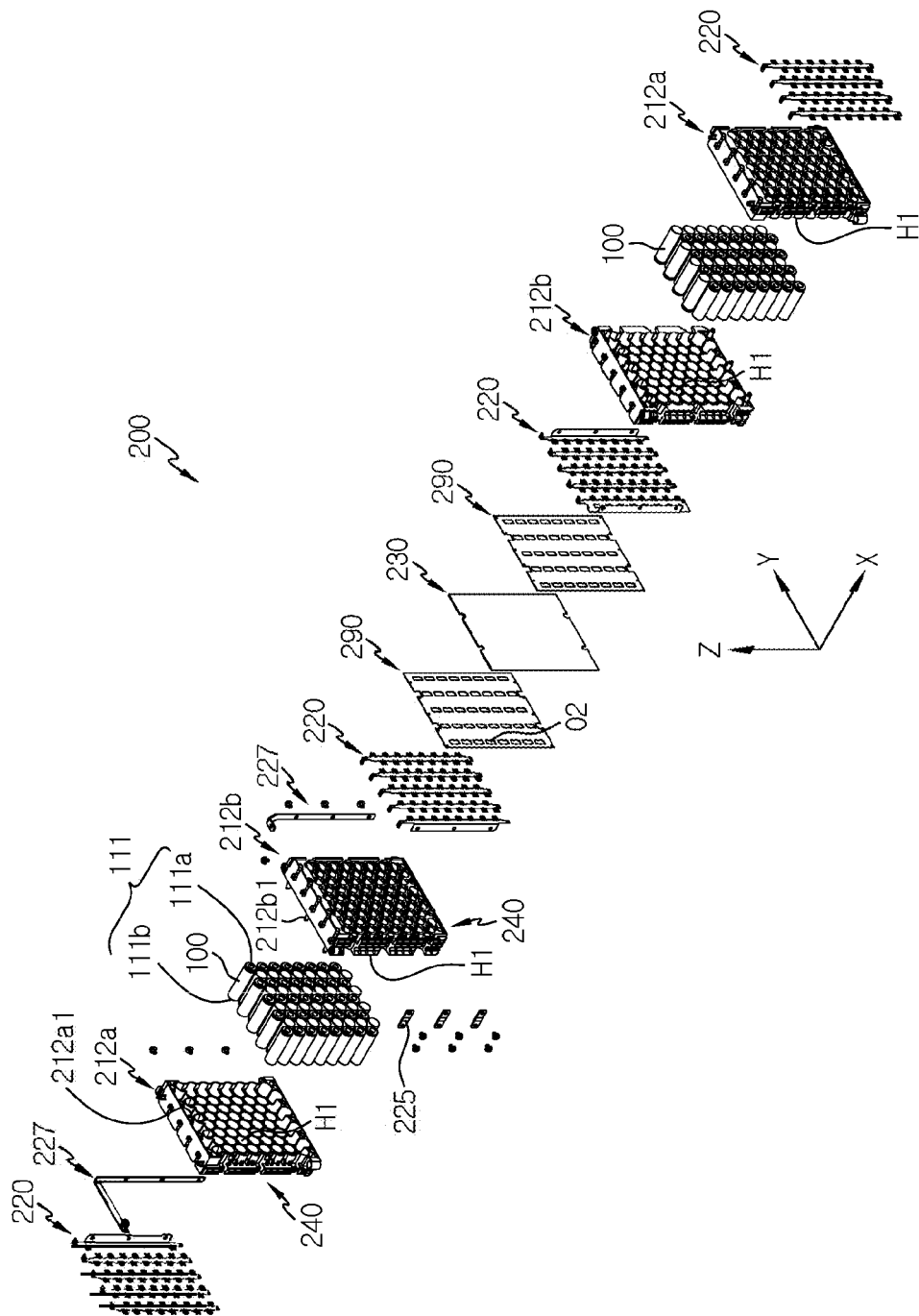
FIG. 2 is an exploded perspective view schematically showing some separated components of the battery module according to an embodiment of the present disclosure.

FIG. 1 is a perspective view schematically showing a battery module according to an embodiment of the present disclosure. FIG. 2 is an exploded perspective view schematically showing some separated components of the battery module according to an embodiment of the present disclosure. In addition, FIG. 3 is a cross-sectional view schematically showing the configuration of a can type secondary battery according to an embodiment of the present disclosure.

Figure 3:
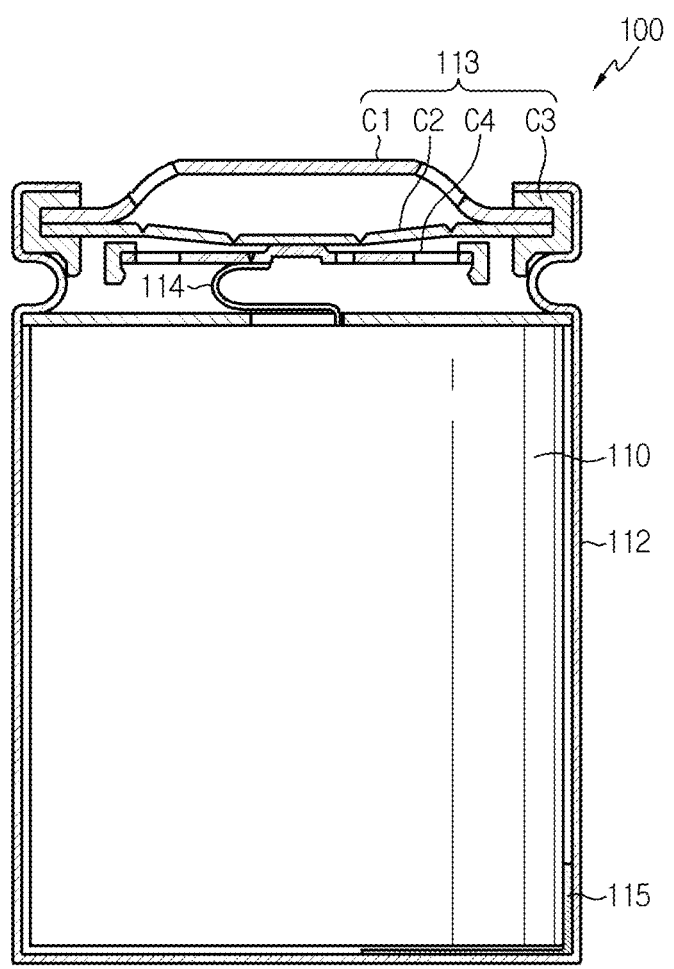
FIG. 3 is a cross-sectional view schematically showing the configuration of a can type secondary battery according to an embodiment of the present disclosure.

Referring to FIGS. 1 to 3, the battery module 200 according to an embodiment of the present disclosure may include a plurality of can type secondary batteries 100, at least one bus bar 220, at least two or more module cases 210, and an internal plate 230.

Here, the can type secondary battery 100 may include an electrode assembly 110, a battery can 112, and a cap assembly 113.

The electrode assembly 110 may have a structure wound with a separator interposed between a positive electrode plate and a negative electrode plate, a positive electrode tab 114 is attached to the positive electrode plate and connected to the cap assembly 113, and a negative electrode tab 115 is attached to the negative electrode plate and connected to the bottom end of the battery can 112.

The battery can 112 may have an empty space formed therein to accommodate the electrode assembly 110. In particular, the battery can 112 may has a cylindrical or square shape and may be configured with an open top end. In addition, the battery can 112 may be formed of a metal material such as steel or aluminum to secure rigidity and the like. In addition, the battery can 112 may has the bottom end to which the negative electrode tab is attached such that the lower portion of the battery can 112 and the battery can 112 may function as a negative electrode terminal.

The cap assembly 113 may be coupled to the top opening portion of the battery can 112 to seal the open end of the battery can 112. The cap assembly 113 may have a shape such as a circular shape or a square shape according to the shape of the battery can 112, and may include sub-components such as a top cap C1, a safety vent C2, and a gasket C3.

Here, the top cap C1 may be located on the uppermost portion of the cap assembly, may be configured to protrude in the upper direction. In particular, such a top cap C1 may function as a positive electrode terminal in the can type secondary battery 100. Accordingly, the top cap C1 may be electrically connected to another secondary battery 100, a load, or a charging device through an external device, such as a bus bar 220. The top cap C1 may be formed of, for example, a metal material such as stainless steel or aluminum.

The safety vent C2 may be configured to deform when the internal pressure of the secondary battery 100, that is, the internal pressure of the battery can 112, increases to a certain level or more. In addition, the gasket C3 may be formed of a material having electrical insulation such that the edge portions of the top cap C1 and the safety vent C2 may be insulated from the battery can 112.

Meanwhile, the cap assembly 113 may further include a current interrupt member C4. The current interrupt member C4 is also called a current interrupt device (CID). When the internal pressure of the battery increases due to gas generation, and the shape of the safety vent C2 is reversed, a contact between the safety vent C2 and the current interrupt member C4 is broken or the current interrupt member C4 is damaged, and thus the electrical connection between the safety vent C2 and the electrode assembly 110 may be blocked.

The configuration of such a can type secondary battery 100 is well known to those skilled in the art at the time of filing of the present disclosure, and thus a more detailed description thereof will be omitted. In addition, although an example of the can type secondary battery 100 is illustrated in FIG. 3, the battery module 200 according to the present disclosure is not limited to the configuration of the specific can type secondary battery 100. That is, various types of secondary batteries known at the time of filing of the present disclosure may be employed in the battery module 200 according to the present disclosure.

For example, the can type secondary battery 100 of FIG. 3 is illustrated with respect to the cylindrical secondary battery 100, but the square secondary battery 100 may be applied to the battery module 200 according to the present disclosure.

Referring to FIG. 2 again, the plurality of can type secondary batteries 100 may be provided to be arranged in the front and back direction (Y direction) and the up and down direction (Z direction). For example, as illustrated in FIG. 2, the plurality of can type secondary batteries 100 may be configured to be arranged in the front and back direction. In addition, the plurality of can type secondary batteries 100 may be configured to be arranged in the up and down direction. Moreover, the plurality of can type secondary batteries 100 may be arranged in which tubular shaped portions in a cylindrical battery can (112 in FIG. 3) face each other.

In particular, in the battery module 200 according to the present disclosure, the plurality of can type secondary batteries 100 may be configured to be laid down in a horizontal direction. Here, the horizontal direction means a direction parallel to the ground. That is, as illustrated in FIG. 2, each can type secondary battery 100 may be configured to be elongated in a left and right direction (X-axis direction of the drawing). At this time, in some of the all can type secondary batteries 100, when viewed in the F direction of FIG. 1, the positive electrode terminal 111a and the negative electrode terminal 111b may be located in the left and right directions, respectively. In addition, in the remaining can type secondary batteries 100, the positive electrode terminal 111a and the negative electrode terminal 111b of each can type secondary battery 100 may be located in the right and left directions, respectively.

Meanwhile, the terms indicating directions such as before, after, left, right, up and down described herein may vary depending on the position of an observer or the form in which an object is placed. However, in the present specification, for convenience of description, the directions of front, back, left, right, up, and down are identified and shown with respect to when viewed in the F direction.

Therefore, according to this configuration of the present disclosure, the height of the battery module 200 may be configured to be low. That is, when the can type secondary battery 100 is laid down, the battery module 200 having a shorter up and down height may be configured. Therefore, it is easy to design the battery module 200 having a low height.

Moreover, the bus bar 220 may electrically connect between the plurality of can type secondary batteries 100, such as all of the secondary batteries 100, or some of the secondary batteries 100. To this end, at least a part of the bus bar 220 may be formed of an electrically conductive material. For example, the bus bar 220 may be formed of a metal material such as copper, aluminum, nickel, or the like.

In particular, in the present disclosure, the bus bar 220, as shown in FIG. 1, may be provided with a body portion 222 and the connection portion 224.

The body portion 222 of the bus bar 220 may be configured in a plate shape. Moreover, the bus bar 220 may be configured in the form of a metal plate to ensure rigidity and electrical conductivity. In particular, the body portion 222 may be configured to be erected in the up and down direction (Z-axis direction of the drawing) along the electrode terminals 111 of the plurality of can type secondary batteries 100. That is, in the present disclosure, when the plurality of can type secondary batteries 100 are lengthily laid down in the left and right direction (X-axis direction of the drawing) and arranged in the front and back direction (Y-axis direction of the drawing) and/or the up and down direction (Z-axis direction of the drawing), the electrode terminals 111 of the various secondary batteries 100 may be configured to be arranged in parallel in the front and back direction and the up and down direction. At this time, the body portion 222 may be configured to be erected flat in the front and back direction or the up and down direction as a plate shape according to the arrangement direction of the electrode terminals 111 of the plurality of secondary batteries 100.

Moreover, the body portion 222 of the bus bar 220 may be configured to have an upper end portion bent in the inner direction. In addition, the upper end portion of the body portion 222 of the bus bar 220 may be a portion for sensing a voltage by a sensing member (not shown). In addition, a contact hole H3 for connection or contact of the sensing member may be formed in the bent portion of the bus bar 220. For example, as illustrated in FIG. 1, the upper end portion of the body portion 222 may be configured to be bent about 90 degrees toward the inner direction.

Specifically, the connection portion 224 may be configured to contact (join) the electrode terminals 111 of the plurality of can type secondary batteries 100 so as to electrically connect the plurality of can type secondary batteries 100. In addition, a plurality of the connection portions 224 may be formed to extend from the body portion 222 in the front and back direction (Y direction). For example, the connection portions 224 may contact the electrode terminals 111 of some secondary batteries 100 among all the secondary batteries 100 to electrically connect the plurality of secondary batteries 100.

Moreover, the connection portion 224 may contact and connect the same polarity of the plurality of can type secondary batteries 100 in parallel. Alternatively, the connection portion 224 may contact and electrically connect the electrode terminals 111 of some secondary batteries 100 among all the secondary batteries 100 in parallel and in series.

In addition, the battery module 200 may include a connection bus bar 225. Specifically, the connection bus bar 225 may be configured to electrically connect the two or more bus bars 220. For example, as shown in FIGS. 1 and 2, the battery module 200 may be provided with three connection bus bars 225. The connection bus bar 225 may be configured such that one side is connected to one bus bar 220 and the other side is connected to another bus bar 220.

Furthermore, the battery module 200 may include an external bus bar 227. Specifically, the external bus bar 227 may serve as a final external input/output electrical terminal of the battery module 200. To this end, the external bus bar 227 may be configured to contact a part (223 in FIG. 11) of the bus bar 220. For example, as illustrated in FIG. 2, the battery module 200 may be provided with two external bus bars 227 that serve as an external input/output positive electrode terminal and an external input/output negative electrode terminal.

In addition, the module case 210 may be configured such that at least two or more module cases are stacked in a direction in which the can type secondary battery 100 is laid down (X direction). For example, as shown in FIG. 1, when viewed in the F direction, the battery module 200 may be configured to stack another module case 210 on the left or right side of one module case 210. The stacking direction is not necessarily limited to one direction, and may be the up and down direction (Z direction) according to the direction in which the can type secondary battery 100 is laid down.

Furthermore, an empty space may be formed in the module case 210 to accommodate the plurality of can type secondary batteries 100. Specifically, the module case 210 may be provided with an outer wall 210c. The outer wall may be formed to surround the empty space formed therein to accommodate the plurality of can type secondary batteries 100. In addition, when viewed in the F direction of FIG. 1, the outer wall 210c of the module case 210 may be provided with a first outer wall 210c1, a second outer wall 210c2, a third outer wall 210c3, a fourth outer wall 210c4, a fifth outer wall 210c5, and a sixth outer wall 210c6 that are formed in the front, back, up, down, left, and right directions to form the inner space.

For example, as shown in FIG. 1, the first outer wall 210c1, the second outer wall 210c2, the third outer wall 210c3, the fourth outer wall 210c4, the fifth outer wall 210c5, and the sixth outer wall 210c6 may be formed such that the front, back, upper, lower, left, and right surfaces of the module case 210 are connected to each other on a plane.

In addition, the module case 210 may be provided with at least a part of an electrically insulating polymer material. For example, the polymer material may be polyvinyl chloride.

Accordingly, according to this configuration of the present disclosure, the module case 210 is provided with the outer wall 210c, thereby effectively protecting the plurality of secondary batteries 100 accommodated therein from external impact.

Figure 4:
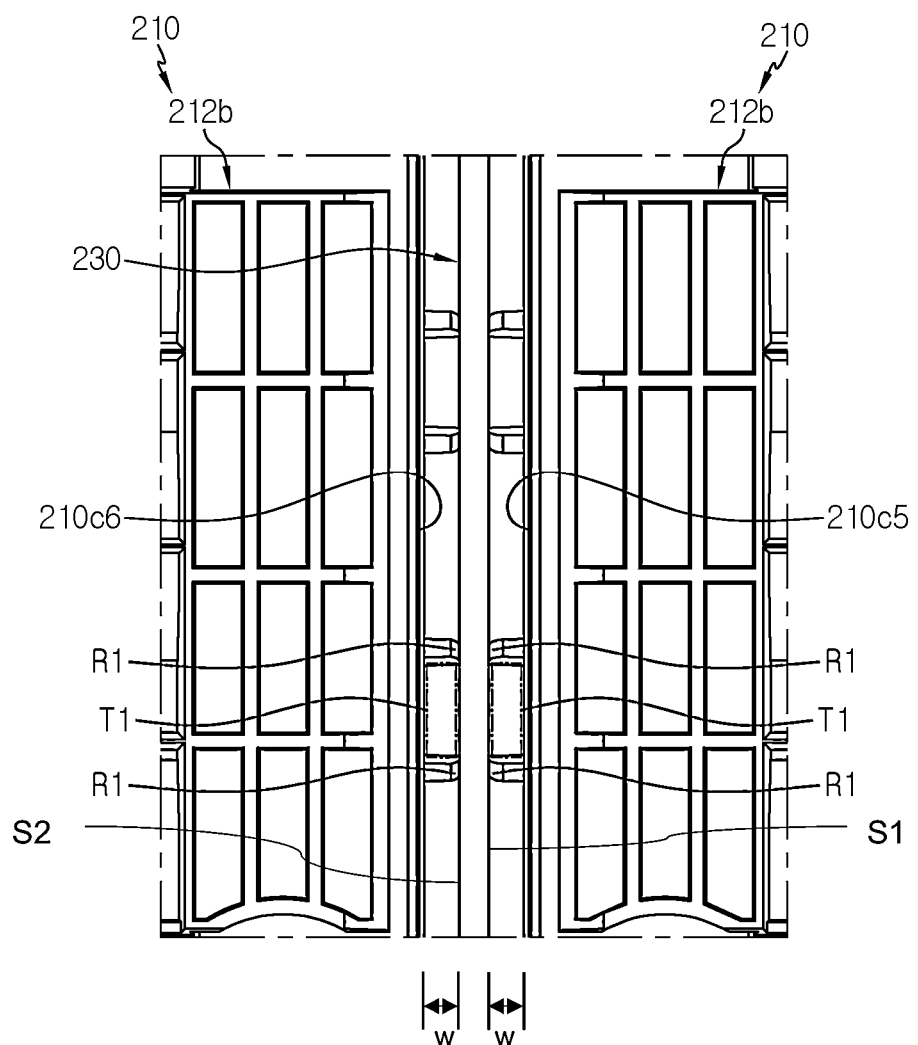
FIG. 4 is an enlarged partial front view schematically showing a region C of the battery module of FIG. 1.

FIG. 4 is an enlarged partial front view schematically showing a region C of the battery module of FIG. 1.

Referring to FIGS. and 4 together, at least two or more ribs R1 formed by protruding from the outer wall 210c of the module case 210 in an outer direction (left-right direction, X-direction) may be provided. That is, the ribs R1 may protrude and extend from the outer wall 210c so as to secure a space apart between the one module case 210 and the other module case 210.

For example, as shown in FIG. 4, when viewed in the F direction, a plurality of ribs R1 may be formed on the right outer wall 210c6 of one module case 210. At this time, the plurality of ribs R1 may protrude from the right outer wall 210c6 in the right direction. In addition, the plurality of ribs R1 may be formed on the left outer wall 210c5 of the other module case 210. Furthermore, the ribs R1 of the other module case 210 may protrude from the left outer wall 210c5 in the left direction. At this time, the ribs R1 of the other module case 210 may be formed at positions corresponding to the ribs R1 of one module case 210.

In addition, referring to FIG. 2 again, the battery module 200 may further include an internal plate 230 and an insulating sheet 290. Specifically, the internal plate 230 may be positioned to be interposed between the two or more module cases 210. Moreover, the internal plate 230 may be configured to be erected in a direction (up and down direction) perpendicular to the stacking direction of the module case 210. That is, the internal plate 230 may be in the form of a plate extending in the up and down direction (Z direction) and in the front and back direction (X direction).

Furthermore, when the plurality of can type secondary batteries 100 accommodated in the two or more module cases 210 fire or explode, the internal plate 230 may block the plurality of can type secondary batteries 100 accommodated in the other module case 210 so as not to be affected by flame or gas. To this end, the internal plate 230 may have a size capable of covering the side portions of the plurality of can type secondary batteries 100 in the horizontal direction.

For example, as illustrated in FIG. 2, the internal plate 230 may be disposed in a direction (X direction) in which the plurality of can type secondary batteries 100 are laid down, that is, in a position where the secondary battery 100 accommodated in one module case 210 and the secondary battery 100 accommodated in the other module case 210 correspond to each other. In addition, both sides of the internal plate 230 in the horizontal direction (X direction) may be positioned to respectively face the right outer wall 210c6 of one module case 210 and the left outer wall 210c5 of the other module case 210. Moreover, the internal plate 230 may have a size capable of covering the whole of the plurality of can type secondary batteries 100 accommodated in the module case 210.

In addition, the internal plate 230 may be positioned to contact the protruding end portion of the rib R1. That is, the internal plate 230 may extend along the end portion of the rib R1 in the up and down direction (Z direction) and the front and back direction (Y direction). For example, as illustrated in FIG. 4, one internal plate 230 may be positioned to have a first surface S1 to contact the end portion of each of the rib R1 formed in one module case 210 and to have a second surface S2 to contact the end portion of each rib R1 formed in the other module case 210.

Therefore, according to this configuration of the present disclosure, when the battery module 200 is charged and discharged, heat generated in the secondary battery 100 may be transferred to the rib R1 of the module case 210 and the internal plate 230 in contact with the rib R1 of the module case 210 and may be dissipated to the outside through air contacting the internal plate 230. Accordingly, the cooling efficiency of the battery module 200 may be improved.

In addition, the internal plate 230 in contact with the rib R1 may form a gas discharge passage T1. Specifically, the gas discharge passage T1 may include the left outer wall 210c5 or the right outer wall 210c6 of the module case 210, and one side surface of the internal plate 230 facing the left outer wall 210c5 or the right outer wall 210c6 in the horizontal direction. The rib R1 of the module case 210 may have a length protruding and extending in a left direction or in a right direction (e.g., a projecting amount) to separate the internal plate 230 from the outer wall 210c by a predetermined distance w such that a space where gas generated between the outer wall 210c of the module case 210 and the internal plate 230 may move is formed. For example, the respective projection amount w of the adjacent ones of the two or more ribs is the same as a width (also 'w') in the horizontal direction of the gas discharge passage. In addition, the ends of the gas discharge passage T1 may be outer circumferential portions (front and back end portions) of the outer wall 210c of the module case 210 in the front and back direction. For example, the internal plate 230, the outer wall 210c5 or 210c6 of one of the module cases 210, and the adjacent ones of the two or more ribs R1 completely and directly surround the gas discharge passage T1 in a cross-sectional view of the gas discharge passage T1.

That is, the gas generated from the plurality of can type secondary batteries 100 may move to the front and back end portions of the outer wall 210c of the module case 210 along the gas discharge passage T1 formed between the outer wall 210c of the module case 210 and one side surface of the internal plate 230 and may be discharged to the outside of the battery module 200.

For example, as illustrated in FIG. 4, the internal plate 230 is interposed between the two module cases 210. In this case, the gas discharge passage T1 including the right outer wall 210c6 of the module case 210 on the right side and one side surface of the internal plate 230 may be formed in the battery module 200. In addition, the gas discharge passage T1 including the left outer wall 210c5 of the right module case 210 and a right side surface of the internal plate 230 may be formed in the battery module 200.

In addition, the insulating sheet 290 may be provided on the outer surface of the bus bar 220. That is, the insulating sheet 290 may be configured to prevent the bus bar 220 from contacting with an external conductive material. Furthermore, the insulating sheet 290 may include an electrically insulating material. In addition, the insulating material may be, for example, a silicone-based polymer (resin). In addition, a plurality of openings (02 in FIG. 2) may be formed in the insulating sheet 290 such that the rib R1 may penetrate the insulating sheet 290.

Figure 5:
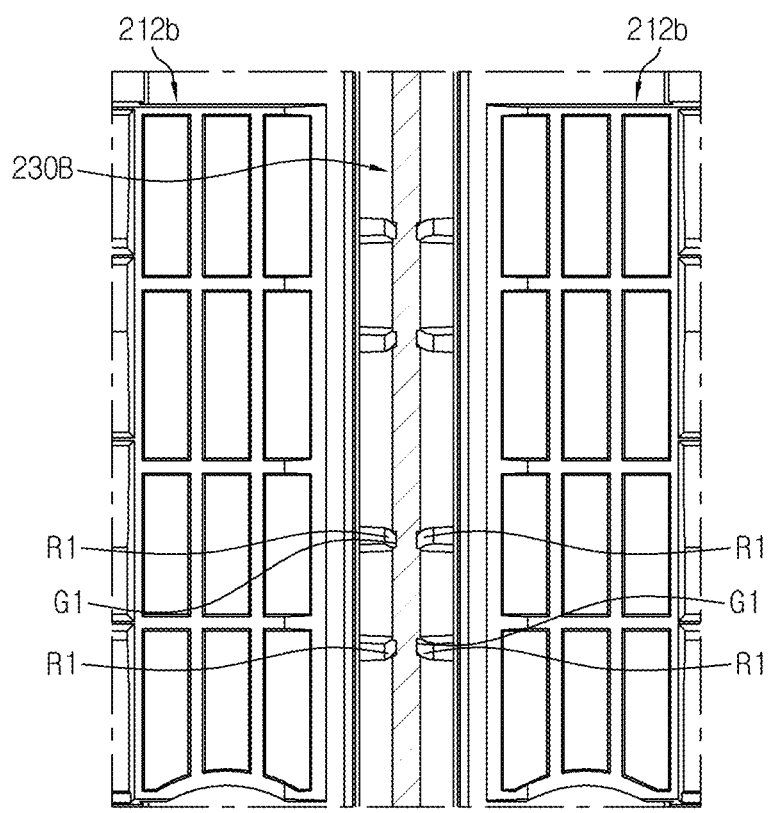
FIG. 5 is a partial front view schematically showing some components of a battery module and an internal plate according to another embodiment of the present disclosure.

FIG. 5 is a partial front view schematically showing some components of a battery module and an internal plate according to another embodiment of the present disclosure. In FIG. 5, for convenience of description below, the internal plate cut in the up and down direction is shown, and the remaining components viewed from the front are schematically shown.

Referring to FIG. 5, when compared to the internal plate 230 of FIG. 4, a fixing groove G1 indented in the inner direction of the body portion may be further formed on the outer surface of the internal plate 230B of FIG. 5. Specifically, the fixing groove G1 may have an indented size such that the end portion of the rib R1 is inserted and fixed. The fixing groove G1 may be formed as many as the number of the ribs R1.

For example, as illustrated in FIG. 5, a plurality of fixing grooves G1 may be formed in the internal plate 230B. The fixing groove G1 may be formed in a position corresponding to the rib R1. In addition, the fixing groove G1 indented from the left to the right in the body and the fixing groove G1 indented from the right to the left in the body may be formed as many as the number of the ribs in the internal plate 230B.

Therefore, according to this configuration of the present disclosure, by forming the fixing groove G1 indented in the inner direction such that the end portion of the rib R1 is inserted and fixed on the outer surface of the internal plate 230B, the internal plate 230B may be easily fixed between the two or more module case 210, thereby facilitating the manufacturing process. In addition, there is an advantage that the cooling efficiency of the battery module 200 may be further increased by effectively increasing a contact area between the fixing groove G1 and the rib R1.

Figure 6:
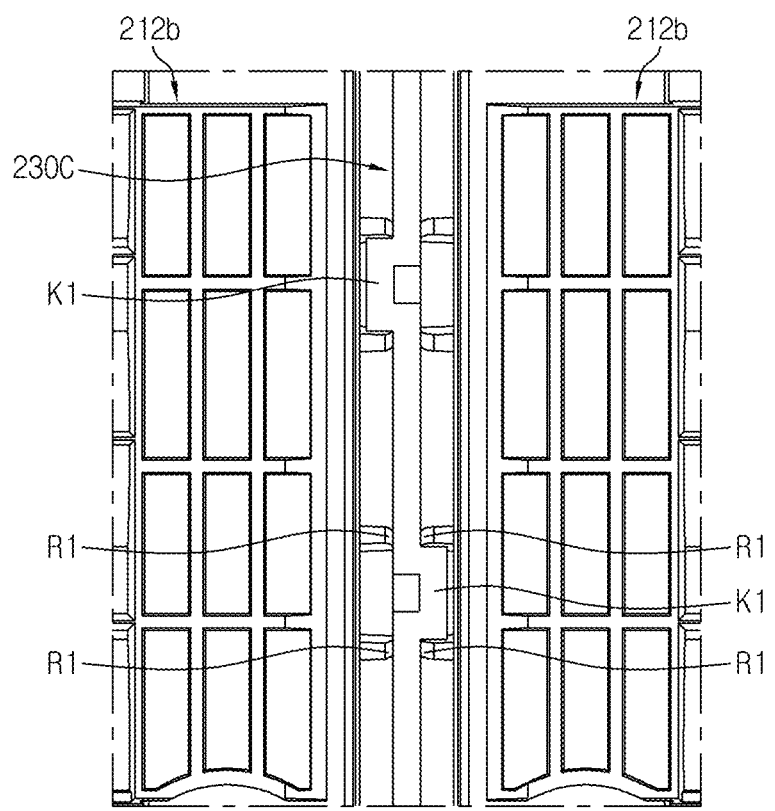
FIG. 6 is a cross-sectional side view schematically showing an enlarged cut part of a battery module according to another embodiment of the present disclosure.

FIG. 6 is a cross-sectional side view schematically showing an enlarged cut part of a battery module according to another embodiment of the present disclosure.

Referring to FIG. 6, when compared to the internal plate 230 of FIG. 4, the internal plate 230C of FIG. 6 may further have an uneven structure K1 of a structure that is bent to protrude in a horizontal direction. Specifically, when the internal plate 230C is erected in the up and down direction, the uneven structure K1 may have a part bent in the left and right direction, a part bent in the up and down direction again, a part bent in the left and right direction again, and a part bent in the up and down direction again.

In addition, the uneven structure K1 may have a shape inserted between the two or more ribs R1. At this time, the length of the uneven structure K1 in the up and down direction may be formed to a size corresponding to the distance between the ribs R1 arranged in the up and down direction.

For example, as illustrated in FIG. 6, the internal plate 230C may have the uneven structure K1 protruding to the left and the uneven structure K1 protruding to the right. At this time, the uneven structure K1 may have a shape inserted between two ribs R1 adjacent in the up and down direction.

Therefore, according to this configuration of the present disclosure, the uneven structure K1 formed on the internal plate 230C is e inserted between the two or more ribs R1, and thus the internal plate 230C may be easily fixed between the two or more module case 210, thereby facilitating the manufacturing process. In addition, there is an advantage that the cooling efficiency of the battery module 200 may be further increased by effectively increasing a contact area between the uneven structure K1 and the rib R1.

Referring back to FIGS. 1 and 2, an empty space may be formed in the one module case 210 such that the one module case 210 may be configured to accommodate some of all the secondary batteries 100. In addition, an empty space may be formed in the other module case 210 such that the other module case 210 may be configured to accommodate the remnants of all the secondary batteries 100. Moreover, as shown in FIG. 2, each of the one module case 210 and the other module case 210 may be configured such that a space for accommodating each secondary battery 100 is separated from each other by a hollow H1. In addition, the hollow H1 may be configured to have the space for accommodating each secondary battery 100, as shown in FIG. 6.

Furthermore, the other module case 210 may be configured to be coupled to one side of the one module case 210 in the horizontal direction (X direction), as shown in FIG. 2. For example, the one module case 210 and the other module case 210 may be coupled to each other by a male and female coupling structure (not shown), or may be bolt fastened to each other (not shown). To the contrary, the one module case 210 and the other module case 210 may be connected to each other without a separate member for fixing each other.

Referring back to FIG. 1, a mounting portion 217 for mounting the bus bar 220 thereon may be formed in each of the one module case 210 and the other module case 210. In addition, a mounting portion 217 for mounting the bus bar 220 thereon may be formed in each of the one module case 210 and the other module case 210. Specifically, the mounting portion 217 may be provided on the outer walls 210c of the left and right sides of each of the one module case 210 and the other module case 210. For example, as illustrated in FIG. 2, the mounting portion 217 may be provided on each of the left outer wall 210c5 and the right outer wall 210c6 of each of the one module case 210 and the other module case 210. A mounting space on which four bus bars 220 may be mounted may be formed in each of the mounting portions 217.

Therefore, according to this configuration of the present disclosure, in the present disclosure, fixing of the plurality of secondary batteries 100 and fixing of the bus bar 220 may be performed by the module case 210 at one time.

Referring back to FIGS. 1 and 2, when the can type secondary battery 100 is a cylindrical secondary battery 100, the hollow H1 formed in the inner space of the module case 210 may be configured in a cylindrical shape to correspond to the shape of the can type secondary battery 100.

More specifically, the hollow H1 of each of the one module case 210 and the other module case 210 may be configured to penetrate the module case 210 in the longitudinal direction (X-axis direction of the drawing) of the secondary battery 100. For example, the hollow H1 for accommodating the secondary battery 100 in the module case 210 is formed to penetrate in the left and right direction (X-axis direction), and thus the electrode terminal 111 of the secondary battery 100 positioned inside the module case 210 may be configured to be exposed to the outside in the left and right direction of the module case 210. Therefore, in this case, the bus bar 220 positioned on the outside may be in direct contact with the electrode terminal 111 of the secondary battery 100 exposed to the outside.

In addition, the module case 210 may be provided with a first frame 212a and a second frame 212b. Here, the first frame 212a and the second frame 212b may be configured to meet and join each other in one side and the other side in the left and right direction (X direction). For example, as shown in FIG. 2, when viewed in the F direction of FIG. 1, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

In particular, the first frame 212a and the second frame 212b may be configured to cover one side and the other side of the plurality of secondary batteries 100, respectively, to wholly cover the outer surface of the can type secondary batteries 100. For example, when the can type secondary battery 100 is the cylindrical secondary battery 100, the first frame 212a and the second frame 212b wholly cover the outer surface of the cylindrical battery, such that the side surface of the secondary battery 100 in the up and down direction may be configured not to be exposed to the outside.

For example, as illustrated in FIG. 2, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

Therefore, according to this configuration of the present disclosure, since the side exposure of the secondary battery 100 is blocked by the module case 210, the insulating property of the secondary battery 100 may be improved, and the secondary battery 100 may be protected from external physical and chemical factors.

In addition, the second frame 212b may be configured to be connected to one side of the first frame 212a in the horizontal direction, as shown in FIG. 2. In addition, the first frame 212a and the second frame 212b may be fixed in a male and female coupling structure. For example, as shown in FIG. 2, a coupling groove 212a1 is formed in the first frame 212a, and a coupling protrusion 212b1 is formed on the second frame 212b and thus the coupling groove 212a1 and the coupling protrusion 212b1 may be coupled to each other.

Furthermore, the other module case 210 may be provided with the first frame 212a and the second frame 212b. Here, when the first frame 212a and the second frame 212b are compared with the first frame 212a and the second frame 212b of the one module case 210 described above, the first frame 212a and the second frame 212b may have the same configuration, except that the positions of the first frame 212a and the second frame 212b are reversely arranged. Specifically, when the front and rear positions of the other module case 210 rotate and change, the first frame 212a and the second frame 212b of the other module case 210 may have the same arrangement as the first frame 212a and the second frame 212b of the one module case 210.

Accordingly, detailed descriptions of the first frame 212a and the second frame 212b of the other module case 210 will be omitted.

Figure 7:
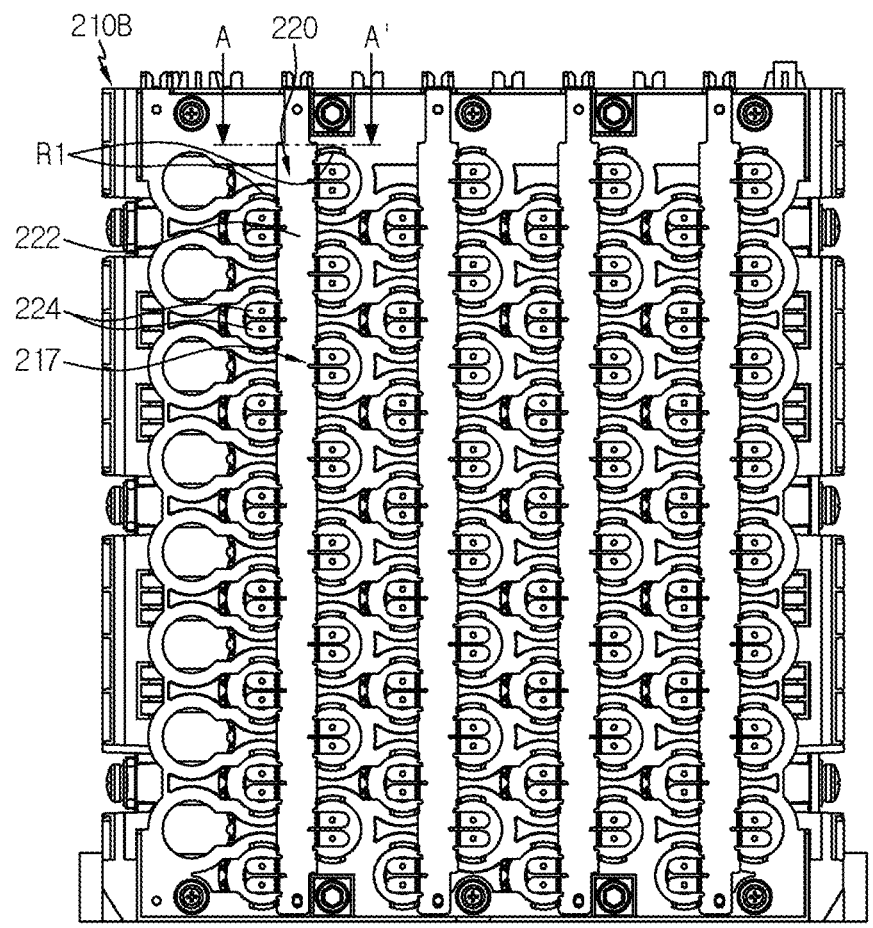
FIG. 7 is a right side view schematically showing a battery module according to another embodiment of the present disclosure.

FIG. 7 is a right side view schematically showing a battery module according to another embodiment of the present disclosure. In addition, FIG. 8 is an enlarged partial cross-sectional view schematically showing a part of the battery module cut along the line A-A' in FIG. 7.

Figure 8:
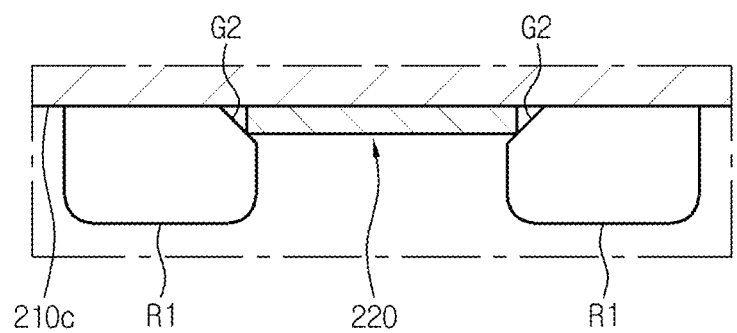
FIG. 8 is an enlarged partial cross-sectional view schematically showing a part of the battery module cut along the line A-A' in FIG. 7.

Referring to FIGS. 7 and 8, unlike the module case 210 of FIG. 1, in a module case 210B disclosed in FIG. 7, a plurality of ribs R1 may be formed in each hollow H1 into which the secondary battery 100 is inserted. That is, the ribs R1 are alternately formed in the hollows arranged in the front and back direction in the module case 210 of FIG. 1, but the module case 210B of FIG. 7 may be configured such that the ribs R1 are continuously formed for each hollow H1 in which the secondary battery is accommodated.

Further, the bus bar 220 may be inserted between one rib R1 and another rib R1 adjacent in the front and back direction. Specifically, one end and the other end of the bus bar 220 in the front and back direction may be configured to respectively contact the one rib R1 and the other adjacent rib R1 arranged in the front and back direction. For example, as shown in FIG. 7, the bus bar 220 may be configured such that a front end contacts the rear end of the one rib R1, and a rear end of the bus bar 220 contacts the front end of the other adjacent rib R1.

Therefore, according to this configuration of the present disclosure, the bus bar 220 is inserted between the one rib R1 and the other adjacent rib R1 formed in a hollow, and thus a process of positioning the bus bar 220 in the mounting portion 217 of the module case 210 may be facilitated. In addition, after the bus bar 220 is inserted, in a welding process with the electrode terminals 111 of the plurality of secondary batteries 100, it is possible to prevent the bus bar 220 from flowing in the front and back direction, and thus the welding process may be performed quickly and completely.

Referring back to FIGS. 7 and 8, a curved groove G2 intended in the inner direction of the body may be formed in the end portion of the rib R1 connected to the outer wall 210c of the module case 210. The curved groove G2 of the rib R1 may be formed in the end portion in a direction in which the bus bar 220 is positioned. The position of the bus bar 220 may be fixed by inserting one end (front end) into the curved groove G2 of the rib R1 and inserting the other end (rear end) into the curved groove G2 of the other rib R1.

For example, as shown in FIG. 8, the bus bar 220 may be interposed between two ribs R1 arranged in the front and back direction and mounted on the mounting portion 217. At this time, the curved grooves G2 may be formed in each of the two ribs R1. In addition, the position of the bus bar 220 may be fixed by inserting the front end into the curved groove G2 of the rib R1 and inserting the rear end into the curved groove G2 of the other rib R1.

Therefore, according to this configuration of the present disclosure, both ends of the bus bar 220 are inserted into and fixed to the curved groove G2 of the rib R1, and thus the bus bar 220 may be fixed not to shaking. Accordingly, there is an advantage that without a separate fixing member for fixing the bus bar 220 on the mounting portion 217, it is possible to manufacture, thereby reducing manufacturing cost and manufacturing time. In addition, in a welding process between the electrode terminals 111 of the plurality of secondary batteries 100 and the bus bars 220, it is possible to prevent the bus bars 220 from shaking, and thus the welding process may be performed quickly and reliably.

Figure 9:
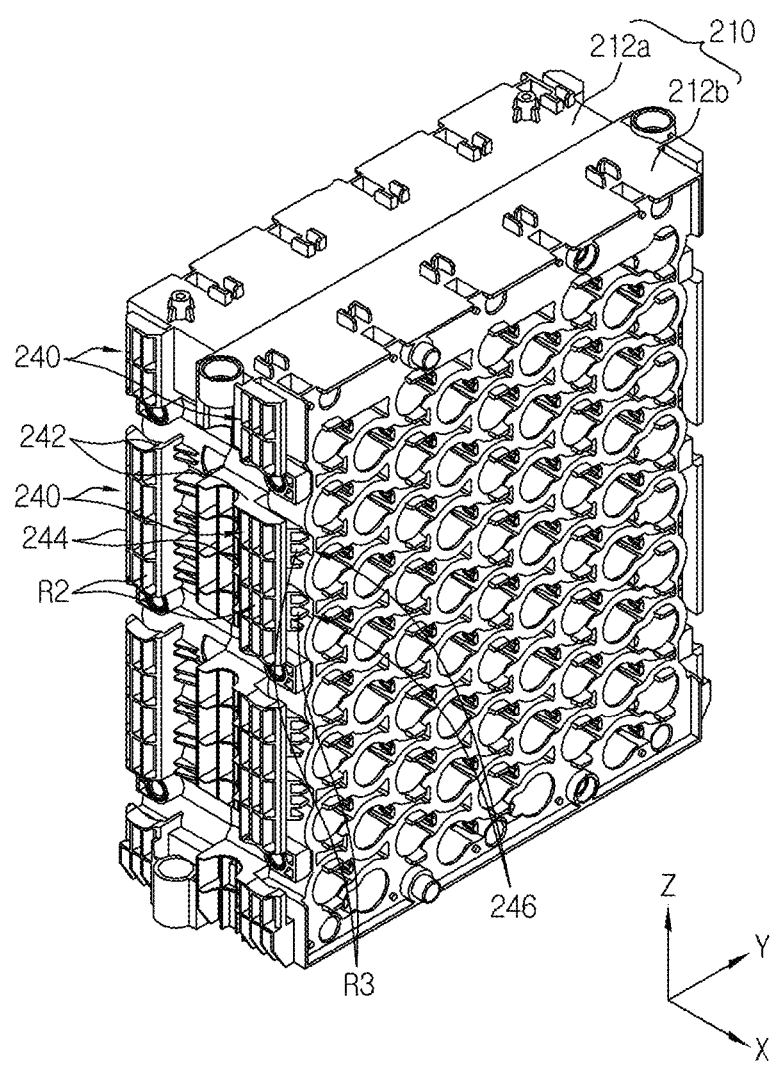
FIG. 9 is a perspective view schematically showing a module case which is a partial component of a battery module according to an embodiment of the present disclosure.

FIG. 9 is a perspective view schematically showing a module case which is a partial component of a battery module according to an embodiment of the present disclosure. In addition, FIG. 10 is a left perspective view schematically showing a module case which is a partial component of a battery module according to an embodiment of the present disclosure.

Figure 10:
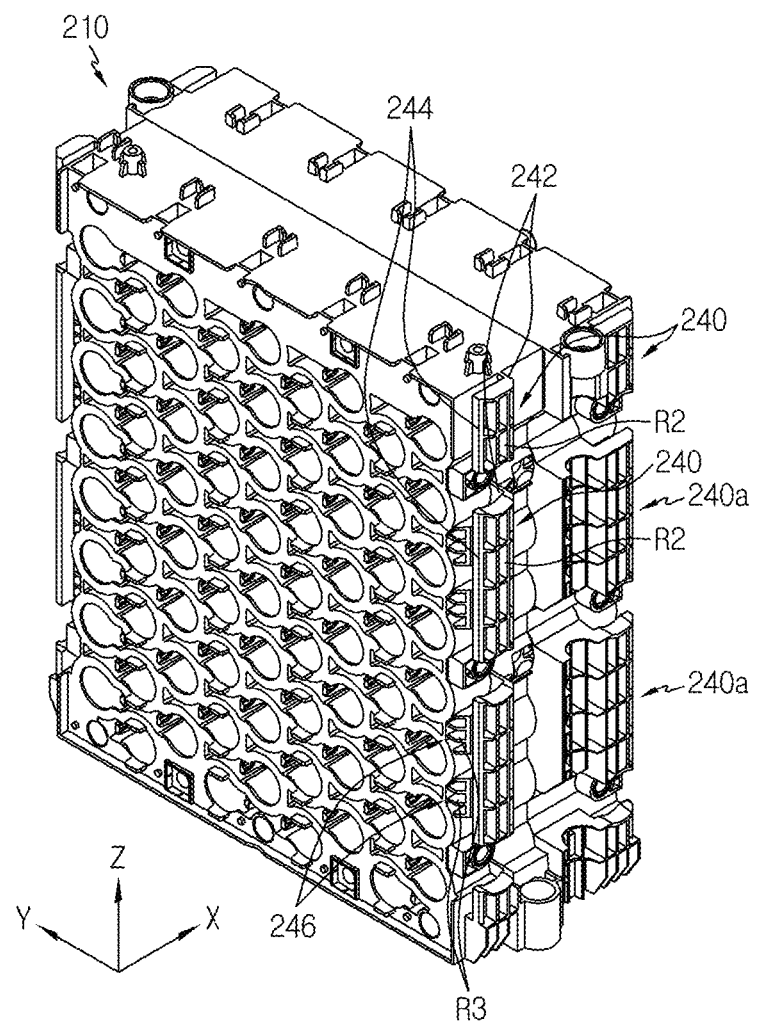
FIG. 10 is a left perspective view schematically showing a module case which is a partial component of a battery module according to an embodiment of the present disclosure.

Referring to FIGS. 9 and 10 together with FIG. 1, the module case 210 may be provided with a bumper portion 240 to absorb external impact applied to the battery module 200. Specifically, the bumper portion 240 may be formed on the outer wall 210c of the module case 210. For example, as illustrated in FIGS. 9 and 10, the bumper portion 240 may be formed on each of the front outer wall 210c1 and the rear outer wall 210c2 of the module case 210.

Therefore, according to this configuration of the present disclosure, the module case 210 is provided with the bumper portion 240 configured to absorb the external impact applied to the battery module 200, and when the external impact occurs in the battery module 200, the bumper unit 240 may preferentially absorb the impact to protect the embedded secondary battery 100. Accordingly, the stability of the battery module 200 may be increased.

In addition, the bumper portion 240 may be formed to protrude in an outer direction from the outer surface of the outer wall 210c. More specifically, the bumper portion 240 may have an extension part 242 and a plate-shaped part 244. Here, the extension part 242 may have a shape protruding and extending in the outer direction from the outer wall 210c of the module case 210.

Moreover, the extension portion 242 may be configured to separate the plate-shaped part 244 apart from the outer wall 210c of the module case 210 by a predetermined distance. The bumper portion 240 secures a distance apart from the outer wall 210c of the module case 210, and thus the external impact applied to the battery module 200 is not directly transferred to the embedded secondary battery 100, and the bumper portion 240 and the outer wall 210c may preferentially collide with each other to cause the bumper portion 240 to absorb more external impact.

In addition, the plate-shaped part 244 may have a shape curved and extending from an end portion of the extension part 242 in the extension direction to a direction corresponding to the outer wall 210c of the module case 210. Further, a linear rib R2 may be formed on the outer surface of the plate shape in the plate-shaped part 244. For example, when viewed from the F direction of FIG. 1, the linear ribs R2 may have a lattice shape in which the linear ribs R2 extending in the left and right direction (X direction) and the up and down direction (Z direction) intersect each other.

In addition, the plate-shaped part 244 may have a curved surface such that the center of the body protrudes convexly on the outer surface in the outer direction. Furthermore, the plate-shaped part 244 may have a plate shape in which the center of the body is convexly curved in the outer direction. For example, as illustrated in FIG. 9, the plate-shaped part 244 may also have a plate shape in which the center of the body is convexly curved forward.

Therefore, according to this configuration of the present disclosure, the bumper portion 240 is provided with the extension part 242 securing the distance and the plate-shaped part 244 on which the linear rib R2 is formed, and thus the bumper portion 240 may effectively absorb the external impact applied to the battery module 200. Accordingly, the secondary battery 100 embedded in the battery module 200 is protected from the external impact, thereby effectively preventing fire or explosion.

Figure 11:
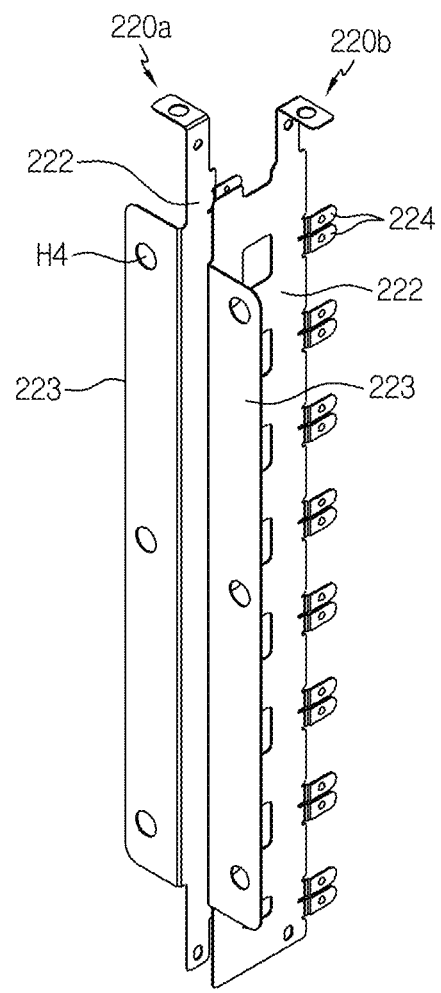
FIG. 11 is an exploded perspective view schematically showing some separated components of the battery module according to an embodiment of the present disclosure.

FIG. 11 is an exploded perspective view schematically showing some separated components of the battery module according to an embodiment of the present disclosure.

Referring back to FIG. 11 together with FIGS. 1 and 10, the bus bar 220a mounted on the one module case 210 may be provided with an expansion portion 223 so as to be connected to the bus bar 220b mounted on the other module case 210. The expansion portion 223 may have a shape extending from the body portion 222 of the bus bar 220 in a vertical direction. A coupling hole H4 for bolt fastening may be formed in the expansion portion 223. The expansion portion 223 may be coupled to the connection bus bar 220 to electrically connect the plurality of secondary batteries 100 mounted on each of the two module cases 210.

For example, each of the two bus bars 220a and 220b provided in the two module cases 210 may further include the expansion portion 223 unlike the other bus bar 220. The expansion portion 223 may have a shape curved in the left or right direction from the body portion 222 of the bus bar 220. In addition, three coupling holes H4 for bolt fastening may be formed in the expansion portion 223.

The expansion portion 223 of the bus bar 220 may be positioned between the plate-shaped part 244 of the bumper portion 240 and the outer wall 210c of the module case 210. Specifically, the expansion portion 223 of the bus bar 220 may be positioned between the plate-shaped part 244 of the bumper portion 240 and the outer wall 210c of the module case 210. For example, as shown in FIG. 1, the expansion portions 223 of the two bus bars 220 may be positioned between the plate-shaped part 244 of the bumper portion 240 and the front outer wall 210c1 of the module case 210.

Therefore, according to this configuration of the present disclosure, the bumper portion 240 of the module case 210 covers a part of the bus bar 220 which is easily exposed in the front and back direction, thereby preventing contact or collision with an external conductive material and maintaining an electrical insulation from the outside. Accordingly, when an external impact occurs, a secondary accident due to the electric leakage of the battery module 200 may be prevented.

Furthermore, referring to FIGS. 9 and 10 again, an auxiliary bumper portion 246 may be further formed in the module case 210. Specifically, the auxiliary bumper portion 246 may be further formed between the bumper portion 240 and the outer wall 210c of the module case 210. That is, the auxiliary bumper portion 246 may be positioned in a space apart between the bumper portion 240 and the outer wall 210c of the module case 210. In addition, the auxiliary bumper portion 246 may have the plate-shaped part 244 on which a linear rib R3 protruding in the inner direction is formed. For example, as illustrated in FIG. 9, eight auxiliary bumper portions 246 positioned inside the four bumper portions 240 may be formed on the front outer wall 210c of the module case 210.

Accordingly, according to this configuration of the present disclosure, by further forming the auxiliary bumper portion 246 in the space apart between the bumper portion 240 and the outer wall 210c of the module case 210, the bumper portion 240 and the auxiliary bumper portion 246 may more effectively absorb external impact applied to the battery module 200. Accordingly, the secondary battery 100 embedded in the battery module 200 is protected from the external impact, thereby effectively preventing fire or explosion.

Meanwhile, a battery pack (not shown) according to an embodiment of the present disclosure may include at least one battery module 200. Further, the battery pack may further include various devices (not shown) for controlling charging and discharging of the battery module 200, for example, a battery management system (BMS), a current sensor, a fuse, etc.

Meanwhile, an electronic device (not shown) according to an embodiment of the present disclosure includes the at least one battery module 200 described above. The electronic device may further include a device housing (not shown) provided with an accommodation space for accommodating the battery module 200 and a display unit that allows a user to check a state of charging of the battery module 200.

In addition, a battery pack according to an embodiment of the present disclosure may be included in a vehicle such as an electric vehicle or a hybrid vehicle. That is, a vehicle according to an embodiment of the present disclosure may be mounted with the battery pack including at least one battery module according to an embodiment of the present disclosure described above on a vehicle body.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS

| | |
|---|---|
| 200: battery module | 100: can type secondary battery |
| 111, 111a, 111b: electrode terminal, positive electrode terminal, negative electrode terminal | |
| 210: module case | |
| 212a, 212b: first frame, second frame | |
| H1: hollow | R1: rib |
| 220, 225, 227: bus bar, connection bus bar, external bus bar | |
| 230: internal plate | G1: fixing groove |
| K1: uneven structure | G2: curved groove |
| 240: bumper portion | 242: extension part |
| 244: plate-shaped part | 223: expansion portion |

INDUSTRIAL APPLICABILITY

The present disclosure relates to a battery module including a plurality of can type secondary batteries. Further, the present disclosure is applicable to an industry related to a battery pack including the battery module and a vehicle including the battery pack.

What is claimed is:

1. A battery module comprising:
a plurality of secondary batteries disposed in a horizontal direction;
a plurality of module cases each with an empty space defined therein to accommodate a subset of the plurality of secondary batteries therein, the plurality of module cases each comprising an outer wall surrounding the respective empty space and a plurality of ribs protruding from the outer wall of each of the plurality of module cases in the horizontal direction, and the plurality of module cases including a first module case and a second module case adjacent to each other and stacked in the horizontal direction; and
an internal plate interposed between the first module case and the second module case in the horizontal direction, the internal plate being erected in a vertical direction perpendicular to the horizontal direction,
wherein the internal plate contacts a protruding end portion of each of the plurality of ribs protruding respectively from the first and second module cases,
wherein the protruding end portions of the ribs of the first module case contact the internal plate on a first surface among opposite outer surfaces of the internal plate,
wherein the protruding end portions of the ribs of the second module case contact the internal plate on a second surface, opposite the first surface of the internal plate, among the opposite outer surfaces of the internal plate,
wherein a space between the internal plate, the outer wall of the first module case, and two adjacent ribs among the ribs of the first module case defines a gas discharge passage to discharge gas to an outside of the battery module, the two adjacent ribs of the first module case being adjacent to each other in the vertical direction,
wherein the internal plate, the outer wall of the first module case, and the two adjacent ribs of the first module case completely surround the gas discharge passage in a cross-sectional view of the gas discharge passage, and
wherein the internal plate includes a first uneven structure having a first part bent in the horizontal direction, a second part bent in the vertical direction, and a third part bent in the horizontal direction to form a first rectangular protrusion inserted between the two adjacent ribs of the first module case and contacting a horizontal surface of at least one of the two adjacent ribs of the first module case in the cross-sectional view.

2. The battery module of claim 1, further comprising:
a bus bar at least partially formed of an electrically conductive material electrically connected with the plurality of secondary batteries,
wherein the bus bar is inserted between two other adjacent ribs among the ribs of the first module case.

3. The battery module of claim 2, wherein a curved groove is indented in an end portion of each of the two other adjacent ribs of the first module case, and
wherein a position of the bus bar is fixed by inserting one end into a curved groove of one of the two other adjacent ribs of the first module case and by inserting the other end into a curved groove of the other one of the two other adjacent ribs of the first module case.

4. The battery module of claim 1, wherein each module case comprises a bumper portion protruding from an outer surface of the outer wall of the respective module case to absorb an external impact applied to the battery module and having a space apart from the outer wall of the respective module case by a predetermined distance.

5. The battery module of claim 4, wherein the bumper portion comprises:
an extension part protruding and extending from the outer wall of the respective module case; and
a plate-shaped part bent and extending from an end portion of the extension part such that the plate-shaped part is parallel to the outer wall of the respective module case, the plate-shaped part having a linear rib formed thereon.

6. The battery module of claim 5, wherein at least a part of the bus bar is between the plate-shaped part of the bumper portion and the outer wall of the respective module case.

7. A vehicle comprising at least one battery pack of claim 1.

8. The battery module of claim 1, wherein each of the secondary batteries has a can shape.

9. The battery module of claim 1, wherein:
the internal plate further includes a second uneven structure having a first part bent in the horizontal direction, a second part bent in the vertical direction, and a third part bent in the horizontal direction to form a second rectangular protrusion inserted between two adjacent ribs among the ribs of the second module case and contacting a horizontal surface of at least one of the two adjacent ribs of the second module case in the cross-sectional view; and
the two adjacent ribs of the second module case are adjacent to each other in the vertical direction.

10. The battery module of claim 9, wherein:
the first uneven structure protrudes leftward from the first surface of the internal plate; and
the second uneven structure protrudes rightward from the second surface of the internal plate.

11. The battery module of claim 10, wherein the internal plate includes a straight portion extending in the vertical direction and having one end connected to the first uneven structure and the other end connected to the second uneven structure.

12. The battery module of claim 1, wherein:
a length of the first uneven structure in the vertical direction corresponds to a distance between the two adjacent ribs of the first module case in the vertical direction; and
the first uneven structure contacts the horizontal surface of each of the two adjacent ribs of the first module case.

13. The battery module of claim 1, wherein:
the two adjacent ribs of the first module case protrude rightward directly from the outer wall of the first module case; and
the first uneven structure of the internal plate protrudes leftward from the first surface of the internal plate.

* * * * *